United States Patent [19]

Laughlin et al.

[11] 3,715,663

[45] Feb. 6, 1973

[54] DOPPLER COMPENSATION BY SHIFTING TRANSMITTED OBJECT FREQUENCY WITHIN LIMITS

[75] Inventors: Charles R. Laughlin, Silver Spring, Md.; Roger C. Hollenbaugh, Shippensburg, Pa.; Walter K. Allen, Silver Spring, Md.

[73] Assignee: The United States of America as represented by the Administrator of the National Aeronautics and Space Administration

[22] Filed: June 18, 1970

[21] Appl. No.: 47,440

Related U.S. Application Data

[62] Division of Ser. No. 701,679, Jan. 30, 1968, Pat. No. 3,534,367.

[52] U.S. Cl. ....................325/4, 325/5, 325/7, 325/8, 325/9, 325/12, 325/17, 325/63, 343/179

[51] Int. Cl. ....................H04b 7/20

[58] Field of Search..........325/3, 4, 5, 7, 8, 9, 12, 17, 325/63, 64; 343/179

[56] References Cited

UNITED STATES PATENTS

| | | | |
|---|---|---|---|
| 3,183,441 | 5/1965 | Francis et al. | 325/4 |
| 3,450,842 | 6/1969 | Lipke | 325/4 |
| 3,483,472 | 12/1969 | Kinkel et al. | 325/63 |
| 3,490,003 | 1/1970 | Herold et al | 340/172.5 |

*Primary Examiner*—Albert J. Mayer
*Attorney*—R. F. Kempf, E. Levy and John R. Manning

[57] ABSTRACT

Disclosed are a system and method for position locating, deriving centralized air traffic control data and communicating via voice and digital signals between a multiplicity of remote aircraft including supersonic transports and a central station, as well as a peripheral ground station (or stations), through a synchronous satellite relay station. Side tone ranging patterns, as well as the digital and voice signals, are modulated on a carrier transmitted from the central station and received on all of the supersonic transports. Each aircraft communicates with the ground stations via a different frequency multiplexed spectrum. Supersonic transport position is derived from a computer at the central station and supplied to a local air traffic controller. Position is determined in response to variable phase information imposed on the side tones at the aircrafts, with a plurality of different side tone techniques being employed, and relayed back to the transports. Common to all of the side tone techniques is Doppler compensation for the supersonic transport velocity.

11 Claims, 4 Drawing Figures

DOPPLER COMPENSATION BY SHIFTING TRANSMITTED OBJECT FREQUENCY WITHIN LIMITS

Figure 8:
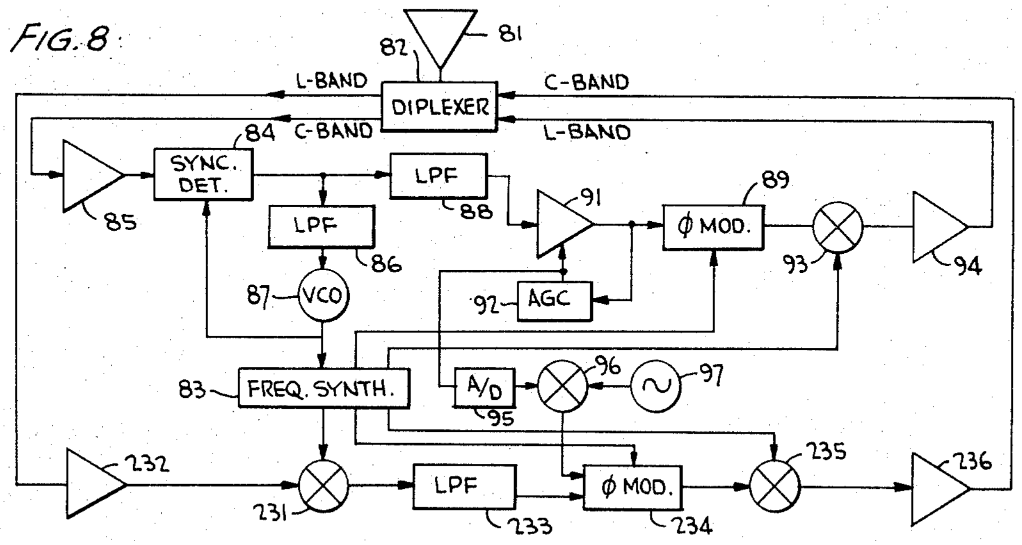
Figure 10:
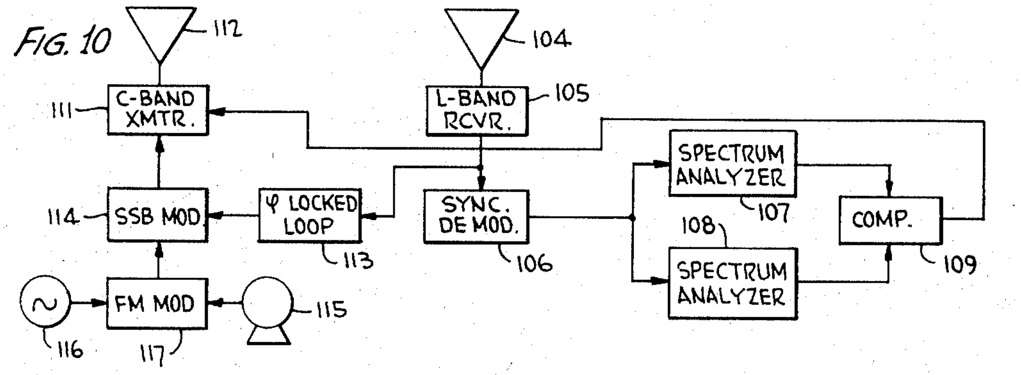

The present application is a division of Ser. Number 701,679, now U.S. Pat. No. 3,534,367, filed Jan. 30, 1968, for Traffic Control System and Method.

ORIGIN OF THE INVENTION

The invention described herein was made by employees of the United States Government and may be manufactured and used by or for the Government for governmental purposes without the payment of any royalties thereon or therefor.

The present invention relates generally to communication systems and methods and more particularly to a system and method for approximately compensating for Doppler frequency shifts imposed on a signal transmitted from a moving object.

The development of the supersonic transport (SST), commercial aircraft capable of flying approximately 2,000 knots, results in aircraft location problems that do not generally exist in tracking subsonic aircraft traveling on the order of 600 knots. SST's flying transoceanic routes must be constantly apprised of the exact location of other SST's in proximity thereto if lane corridors of approximately 100 miles, as are now standard in subsonic transoceanic aircraft traffic control, are to be utilized or reduced. The requirement for positional data regarding adjacent aircraft is even more necessary for an SST because such an aircraft flying at 2,000 knots has a 2 to 3 minute separation relative to another aircraft 100 miles away, in contrast to a ten minute separation of aircrafts flying at 600 knots with the same displacement. Hence, with SST's there is a greater need for constant on board and centralized surveillance of adjacent aircraft to avoid midair collisions and mishaps than with transoceanic subsonic aircraft.

In accordance with the invention claimed in the copending application of Laughlin, Jr. et al., Ser. No. 701,679, now U.S. Pat. No. 3,534,367 filed Jan. 30, 1968, for Traffic Control System and Method, commonly assigned with the present application, the position of a vehicle, such as a transoceanic SST, is determined by a computer at a central ground location, supplied to a central air traffic controller having responsibility for that and adjacent aircraft, and transmitted to a number of adjacent vehicles in flight via a synchronous satellite positioned to relay signals between the vehicles and ground station. The position indicating signals returning from the aircraft are variable phase side tones modulated on a carrier generally having a frequency in the microwave region. Because a portion of the positional information is represented as the carrier frequency from each aircraft, it is a requirement of the present system and method that phase coherence be maintained between receiving and transmitting apparatus at the central station and on each of the SST's.

A problem in maintaining minimum bandwidth and phase coherence between apparatus maintained on the SST's and at the ground station is with regard to Doppler effect caused by a receiving object moving at a velocity of 2,000 knots. In particular, an SST flying at 2,000 knots produces a two-way frequency shift in excess of ±10 kilohertz (KHz) on a 1.5 gigahertz (GHz) carrier. To maintain minimum bandwidth and phase coherence between the SST and ground station equipment, therefore, it is necessary to compensate for Doppler effect resulting from the extremely high velocity of the SST in a manner without destroying phase coherence. Perhaps the most straightforward and obvious method for overcoming the problem caused by Doppler effect on the carrier frequency transmitted from the aircraft is to provide no compensation at all and allocate a bandwidth for each aircraft sufficiently broad to include the maximum Doppler shift. With possible Doppler shift frequencies on the order of ±10 KHz, however, the bandwidth associated with each SST would be so great as to prevent efficient transmission between each aircraft and the ground station.

Another approach to the problem of Doppler shift on the carrier frequency derived from an SST is exact compensation, whereby the frequency transmitted from the aircraft is shifted by an ultrastable oscillator on the aircraft so that at all times the resultant frequency transmitted from the aircraft appears to be constant. Thereby, ground station and satellite receivers would always be tuned exactly to the same center frequency transmitted to and received from the aircraft; however, phase coherence between received and transmitted carriers would not be maintained since an independent oscillator must be inserted on each aircraft. Since phase coherence is necessary and an oscillator with the required stability could not be flown on each aircraft, it is not practical to compensate exactly for Doppler frequency shifts.

In accordance with an aspect of the present invention, a compromise is struck between exact Doppler frequency compensation and a system requiring an extremely wide bandwidth. The frequency of the carrier received on the aircraft is measured and compared with a reference to provide an indication of Doppler frequency shift. In response to the difference between the received and reference frequencies, one of a plurality of Doppler frequency ranges is selected and indicated by a digital signal that modulates the carrier transmitted from the aircraft. The difference between the boundary value of the selected range and the difference frequency is an offset of the apparent carrier frequency transmitted from the aircraft relative to the aircraft carrier frequency under static flight conditions. The ground station responds to the digital signal transmitted from the aircraft to supply the computer with an input used in one position finding technique, while simultaneously monitoring the carrier transmitted from the aircraft to provide a measure of the difference between the boundary value of the selected range and the actual carrier. Phase coherence between the aircraft and ground station is preserved without requiring a wide bandwidth in the link between them be tracking the carrier frequency and phase with a phase locked loop while avoiding the problems associated with exact Doppler compensation. To prevent oscillation of the carrier frequency between two boundary values, as the Doppler frequency shifts slightly about a boundary of a range value, hysterosis is provided in the aircraft Doppler compensation circuit indicating frequency range. Hysteresis in the present description is, therefore, defined as a delay in shifting from a first frequency range to a second, adjacent overlapping frequency range, as long as an overlap between the two adjacent ranges persists.

It is, accordingly, an object of the present invention to provide a new and improved system and method for compensating Doppler frequency shifts imposed on a carrier frequency transmitted from a moving object.

Another object of the invention is to provide a communication system and method for relaying information in a relatively narrow frequency band through a transceiver on an object, despite wide changes that would normally be imposed on a carrier frequency transmitted from the transceiver because of large speeds thereof.

An additional object of the invention is to provide a Doppler frequency compensation system and method wherein a signal transmitted from a transceiver on a fast moving object is maintained within a predetermined, relatively narrow bandwidth, without requiring exact Doppler frequency compensation.

A further object of the invention is to provide, in a phase coherent communication system, a new and improved system and method for providing Doppler frequency shift compensation.

Figure 11:
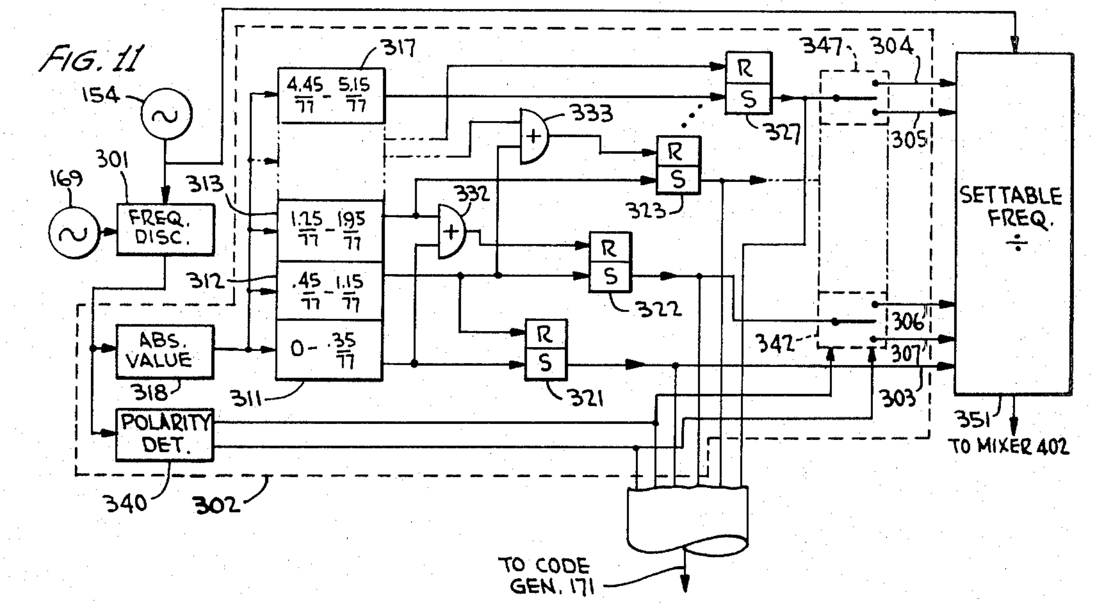
Figure 9:
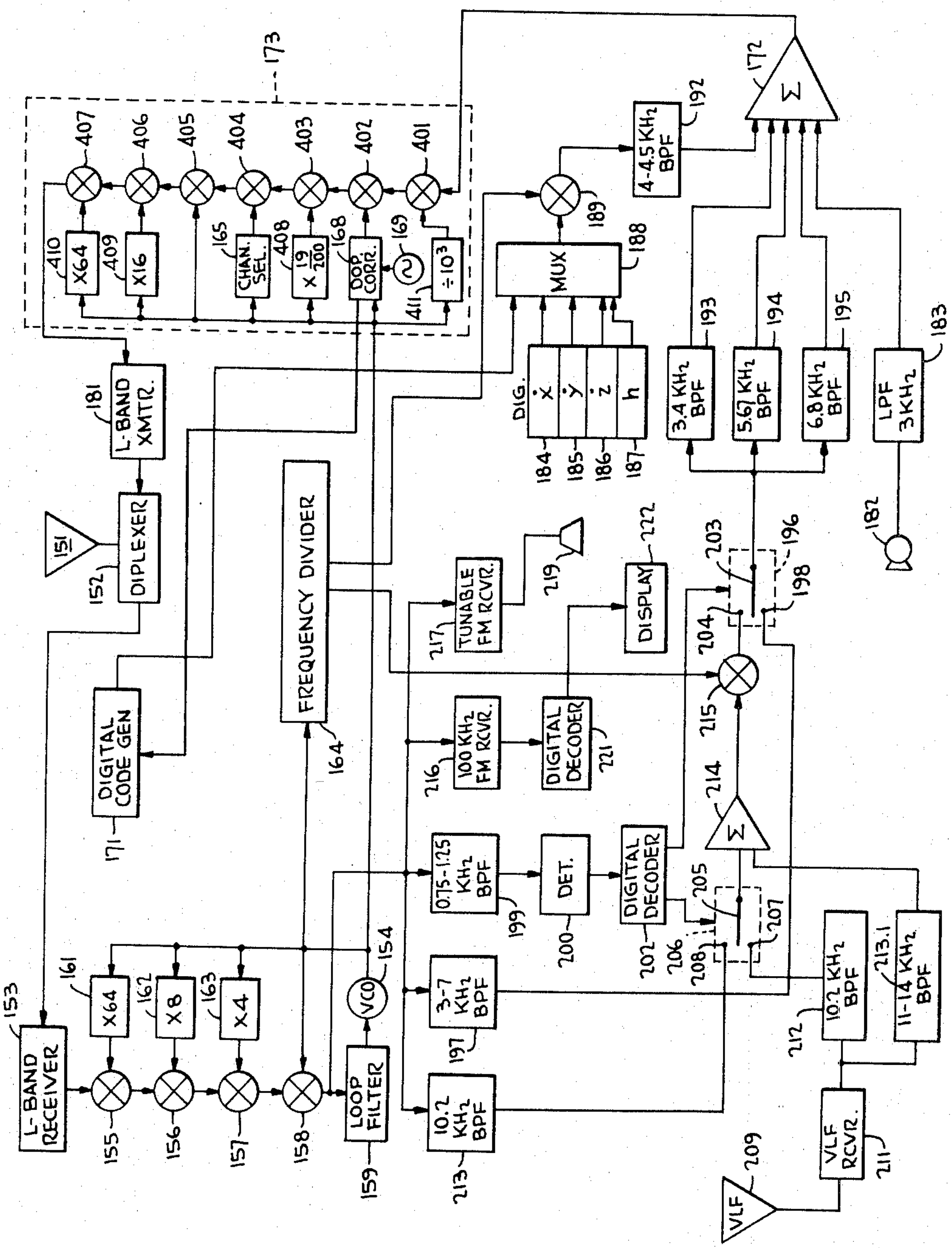

The above and still further objects, features and advantages of the present invention will become apparent upon consideration of the detailed description of one specific embodiment thereof, wherein:

The drawing, as well as the brief and detailed descriptions of the drawing included with the application of Laughlin, Jr. et al, filed January 30, 1968, Ser. No. 701,679, now U.S. Pat. No. 3,534,367 for Traffic Control System and Method, and commonly assigned with the present application, are incorporated herein by reference. Particular attention is directed to FIG. 11 of said patent, as well as the description thereof initially beginning on column 16, line 50 and extending to column 17 line 23 which resumes on column 23, line 54 and extends to column 26, line 56.

We claim:

1. A method of communicating via a relatively narrow bandwidth link between a station and an object moving relative to the station, said object being capable of appreciably Doppler shifting the frequency of a signal received thereby comprising transmitting a signal of predetermined frequency from the station, receiving the signal on the object, measuring the Doppler frequency shift of the predetermined frequency as received on the object, and shifting a carrier frequency transmitted from the object to the station by discrete steps in response to the Doppler frequency shift exceeding predetermined boundary levels so that the apparent carrier frequency transmitted from the object as received at the station lies within predetermined limits equal to one of said steps.

2. A system for compensating for the Doppler frequency shift imposed on carrier frequencies transmitted to and from an object moving with respect to a station transmitting a carrier frequency to the predetermined object and receiving a carrier frequency from the object comprising an oscillator deriving a variable frequency in response to the carrier frequency received on the object, means for coupling the oscillator variable frequency to transmitter means for the carrier transmitted from the object, and means for measuring the Doppler shift frequency of the received carrier, said coupling means including means responsive to the measured shift frequency for maintaining the carrier frequency transmitted from the object within a finite range defined as a predetermined Doppler shift frequency regardless of the Doppler shift frequency of the received carrier, said finite range being less than the possible Doppler frequency shift of the received carrier.

3. The system of claim 2 wherein said means for maintaining the carrier frequency transmitted from the object within a finite range defined as a predetermined Doppler shift frequency regardless of the Doppler shift frequency of the received carrier, comprises means for shifting the carrier transmitted from the object by a step equal approximately to said range each time the measured Doppler shift frequency exceeds said range or a multiple thereof.

4. The system of claim 3 wherein said means for shifting includes hysteresis means about each of said steps.

5. A system for compensating for the Doppler frequency shift imposed on carrier frequencies received by and transmitted from a transceiver on an object moving relative to a station transmitting a signal of predetermined frequency to the object and receiving the transmitted carrier frequency from the object comprising means responsive to the received signal for deriving a first wave having a frequency varying with frequency shifts of the predetermined frequency as received on the object, means comparing said first wave with a reference frequency for deriving a control signal, means responsive to the control signal for step changing the frequency of said first wave to derive a second wave to maintain the frequency of the second wave always within predetermined boundaries, and means responsive to the second wave for deriving the carrier frequency transmitted from the object to the station, said carrier frequency always being within a predetermined range established by the predetermined boundaries.

6. The system of claim 5 wherein said first wave deriving means includes means for frequency dividing the received frequency.

7. The system of claim 6 wherein said carrier frequency deriving means includes means for frequency multiplying said second wave so that the transmitted carrier frequency and a carrier for the received signal are in the same band.

8. The system of claim 5 wherein said carrier frequency deriving means includes means for frequency multiplying said second wave.

9. The system of claim 5 wherein said means for step changing includes means for changing the wave frequency through a gamut of steps, and further including means for deriving a signal indicative of the number of the step in the gamut, and means for modulating the transmitted carrier frequency with said step indicating signal.

10. A system for compensating for the Doppler frequency shift imposed on carrier frequencies received by and transmitted from a transceiver on an object moving relative to a station transmitting the carrier frequency to the object and responsive to carrier frequencies transmitted from the object comprising means responsive to a frequency received on the object from the station for deriving a first control signal indicative of the departure of the received signal frequency from a predetermined value therefor, a plurality of amplitude comparison means responsive to the first control signal for deriving a second control signal indicative of in which one of a plurality of amplitude ranges the first control signal lies, means responsive to the received carrier frequency for deriving the transmitted carrier, said last-named means including means responsive to the second control signal for dividing the received carrier frequency by one of a plurality of factors dependent upon the amplitude range indicated by the second control signal.

11. The system of claim 10 wherein adjacent ones of the amplitude ranges have overlapping regions, and the second control signal deriving means includes means for preventing changes in the amplitude range indication until the amplitude is outside of the overlapping region.

* * * * *